(12) United States Patent
Ferrari et al.

(10) Patent No.: US 12,259,485 B2
(45) Date of Patent: Mar. 25, 2025

(54) USER EQUIPMENT SIGNALING TO SUPPORT BIAS DETECTION

(71) Applicant: QUALCOMM Incorporated, San Diego, CA (US)

(72) Inventors: Lorenzo Ferrari, Castro Valley, CA (US); Alexandros Dinh Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 298 days.

(21) Appl. No.: 17/757,690

(22) PCT Filed: Nov. 24, 2020

(86) PCT No.: PCT/US2020/062064
§ 371 (c)(1),
(2) Date: Jun. 17, 2022

(87) PCT Pub. No.: WO2021/154376
PCT Pub. Date: Aug. 5, 2021

(65) Prior Publication Data
US 2023/0035463 A1 Feb. 2, 2023

(30) Foreign Application Priority Data
Jan. 31, 2020 (GR) .............................. 20200100052

(51) Int. Cl.
*G01S 5/02* (2010.01)
*G01S 5/00* (2006.01)
*H04W 64/00* (2009.01)
(52) U.S. Cl.
CPC .......... *G01S 5/0244* (2020.05); *G01S 5/0072* (2013.01); *G01S 5/0236* (2013.01); *H04W 64/003* (2013.01)

(58) Field of Classification Search
CPC .... G01S 5/0244; G01S 5/0072; G01S 5/0236; H04W 64/003
(Continued)

(56) References Cited

U.S. PATENT DOCUMENTS

| | | | |
|---|---|---|---|
| 5,420,592 A | * | 5/1995 | Johnson .................. G01S 19/35 342/357.46 |
| 2011/0102251 A1 | * | 5/2011 | Morrison .............. G01S 19/252 342/357.23 |

(Continued)

FOREIGN PATENT DOCUMENTS

| CN | 109005584 A | 12/2018 |
|---|---|---|
| CN | 110572232 A | 12/2019 |

(Continued)

OTHER PUBLICATIONS

International Search Report and Written Opinion—PCT/US2020/062064—ISA/EPO—Mar. 18, 2021.

*Primary Examiner* — Michael R Neff
(74) *Attorney, Agent, or Firm* — Muncy, Geissler, Olds & Lowe, P.C./Qualcomm

(57) ABSTRACT

Disclosed are techniques for wireless communication. In an aspect, a user equipment (UE) receives one or more positioning reference signals from a first transmission-reception point (TRP) involved in a positioning session with the UE, detects whether or not there is a positioning bias event associated with the first TRP based on one or more parameters related to the one or more positioning reference signals, the positioning bias event affecting an accuracy of a location estimate of the UE, and transmits, in response to the detection that there is a positioning bias event, a report of the positioning bias event to a network node. Upon receiving the report, the network node performs one or more corrective actions to address the positioning bias event.

28 Claims, 12 Drawing Sheets

(58) Field of Classification Search
USPC .................................................... 455/456.1
See application file for complete search history.

(56) References Cited

U.S. PATENT DOCUMENTS

2016/0234709 A1* 8/2016 Fischer ................ H04W 64/00
2017/0059689 A1   3/2017 Edge et al.
2018/0270727 A1* 9/2018 Kim .................... H04W 36/247

FOREIGN PATENT DOCUMENTS

| EP | 1253438 | A2 | 10/2002 |
| EP | 3203791 | A1 | 8/2017 |
| WO | 2016126713 | A1 | 8/2016 |

* cited by examiner

USER EQUIPMENT SIGNALING TO SUPPORT BIAS DETECTION

CROSS-REFERENCE TO RELATED APPLICATIONS

The present Application for Patent claims priority under 35 U.S.C. § 371 to International Application No. PCT/US2020/062064, entitled "USER EQUIPMENT SIGNALING TO SUPPORT BIAS DETECTION," filed Nov. 24, 2020, which claims priority under 35 U.S.C. § 119 to Greek patent application No. 20200100052, entitled "USER EQUIPMENT SIGNALING TO SUPPORT BIAS DETECTION," filed Jan. 31, 2020, both of which are assigned to the assignee hereof and expressly incorporated herein by reference in their entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a first network node includes receiving one or more positioning reference signals from a second network node involved in a positioning session with the first network node, detecting whether or not there is a positioning bias event associated with the second network node based on one or more parameters related to the one or more positioning reference signals, the positioning bias event affecting an accuracy of a location estimate of a user equipment (UE), and in response to the detection that there is a positioning bias event, transmitting a report of the positioning bias event to a third network node.

In an aspect, a method of wireless communication performed by a network node includes receiving a first report indicating that a first network node has detected a positioning bias event associated with a second network node based on one or more parameters related to one or more positioning reference signals from the second network node, the positioning bias event affecting an accuracy of a location estimate of the first network node, and performing one or more corrective actions to address the positioning bias event.

In an aspect, a first network node includes a memory, at least one transceiver, and at least one processor communicatively coupled to the memory and the at least one transceiver, the at least one processor configured to: receive, via the at least one transceiver, one or more positioning reference signals from a second network node involved in a positioning session with the first network node, detect whether or not there is a positioning bias event associated with the second network node based on one or more parameters related to the one or more positioning reference signals, the positioning bias event affecting an accuracy of a location estimate of a user equipment (UE), and cause the at least one transceiver to transmit, in response to the detection that there is a positioning bias event, a report of the positioning bias event to a third network node.

In an aspect, a network node includes a memory, at least one transceiver, and at least one processor communicatively coupled to the memory and the at least one transceiver, the at least one processor configured to: receive, via the at least one transceiver, a first report indicating that a first network node has detected a positioning bias event associated with a second network node based on one or more parameters related to one or more positioning reference signals from the second network node, the positioning bias event affecting an accuracy of a location estimate of the first network node, and perform one or more corrective actions to address the positioning bias event.

In an aspect, a first network node includes means for receiving one or more positioning reference signals from a second network node involved in a positioning session with the first network node, means for detecting whether or not there is a positioning bias event associated with the second network node based on one or more parameters related to the one or more positioning reference signals, the positioning bias event affecting an accuracy of a location estimate of a user equipment (UE), and means for transmitting, in response to the detection that there is a positioning bias event, a report of the positioning bias event to a third network node.

In an aspect, a network node includes means for receiving a first report indicating that a first network node has detected a positioning bias event associated with a second network node based on one or more parameters related to one or more positioning reference signals from the second network node, the positioning bias event affecting an accuracy of a location estimate of the first network node, and means for performing one or more corrective actions to address the positioning bias event.

In an aspect, a non-transitory computer-readable medium storing computer-executable instructions includes computer-executable instructions comprising at least one instruction instructing a first network node to receive one or more positioning reference signals from a second network node involved in a positioning session with the first network node, at least one instruction instructing the UE to detect whether or not there is a positioning bias event associated with the second network node based on one or more parameters related to the one or more positioning reference signals, the positioning bias event affecting an accuracy of a location estimate of a user equipment (UE), and at least one instruction instructing the UE to transmit, in response to the detection that there is a positioning bias event, a report of the positioning bias event to a third network node.

In an aspect, a non-transitory computer-readable medium storing computer-executable instructions includes computer-executable instructions comprising at least one instruction instructing a network node to receive a first report indicating that a first network node has detected a positioning bias event associated with a second network node based on one or more parameters related to one or more positioning reference signals from the second network node, the positioning bias event affecting an accuracy of a location estimate of the first network node, and at least one instruction instructing the network node to perform one or more corrective actions to address the positioning bias event.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
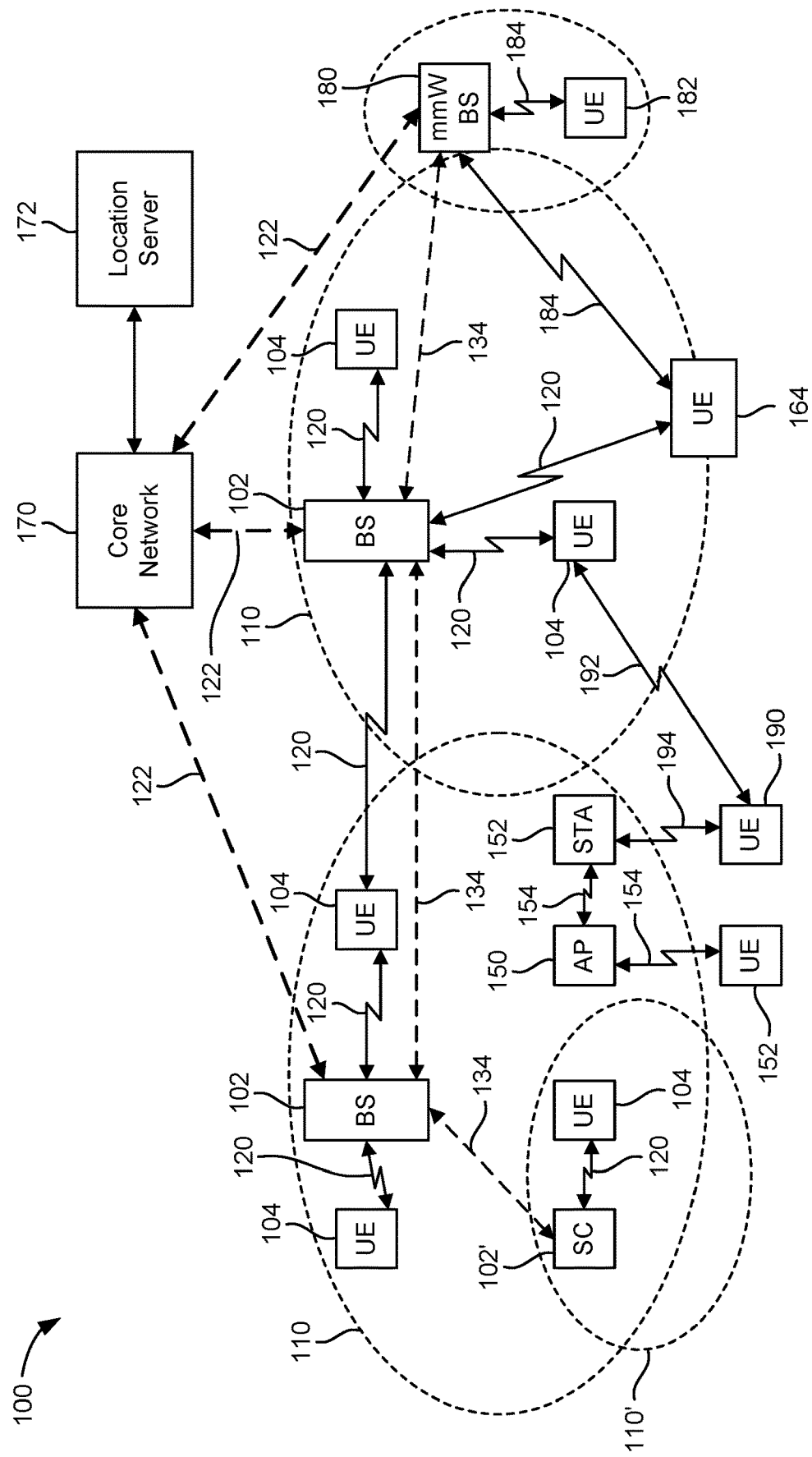
FIG. 1 illustrates an example wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or UT, a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference RF signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal.

According to various aspects, FIG. 1 illustrates an example wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a target reference RF signal on a target beam can be derived from information about a source reference RF signal on a source beam. If the source reference RF signal is QCL Type A, the receiver can use the source reference RF signal to estimate the Doppler shift, Doppler spread, average delay, and delay spread of a target reference RF signal transmitted on the same channel. If the source reference RF signal is QCL Type B, the receiver can use the source reference RF signal to estimate the Doppler shift and Doppler spread of a target reference RF signal transmitted on the same channel. If the source reference RF signal is QCL Type C, the receiver can use the source reference RF signal to estimate the Doppler shift and average delay of a target reference RF signal transmitted on the same channel. If the source reference RF signal is QCL Type D, the receiver can use the source reference RF signal to estimate the spatial receive parameter of a target reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters for a transmit beam for a second reference signal can be derived from information about a receive beam for a first reference signal. For example, a UE may use a particular receive beam to receive one or more reference downlink reference signals (e.g., positioning reference signals (PRS), tracking reference signals (TRS), phase tracking reference signal (PTRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), PTRS, etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
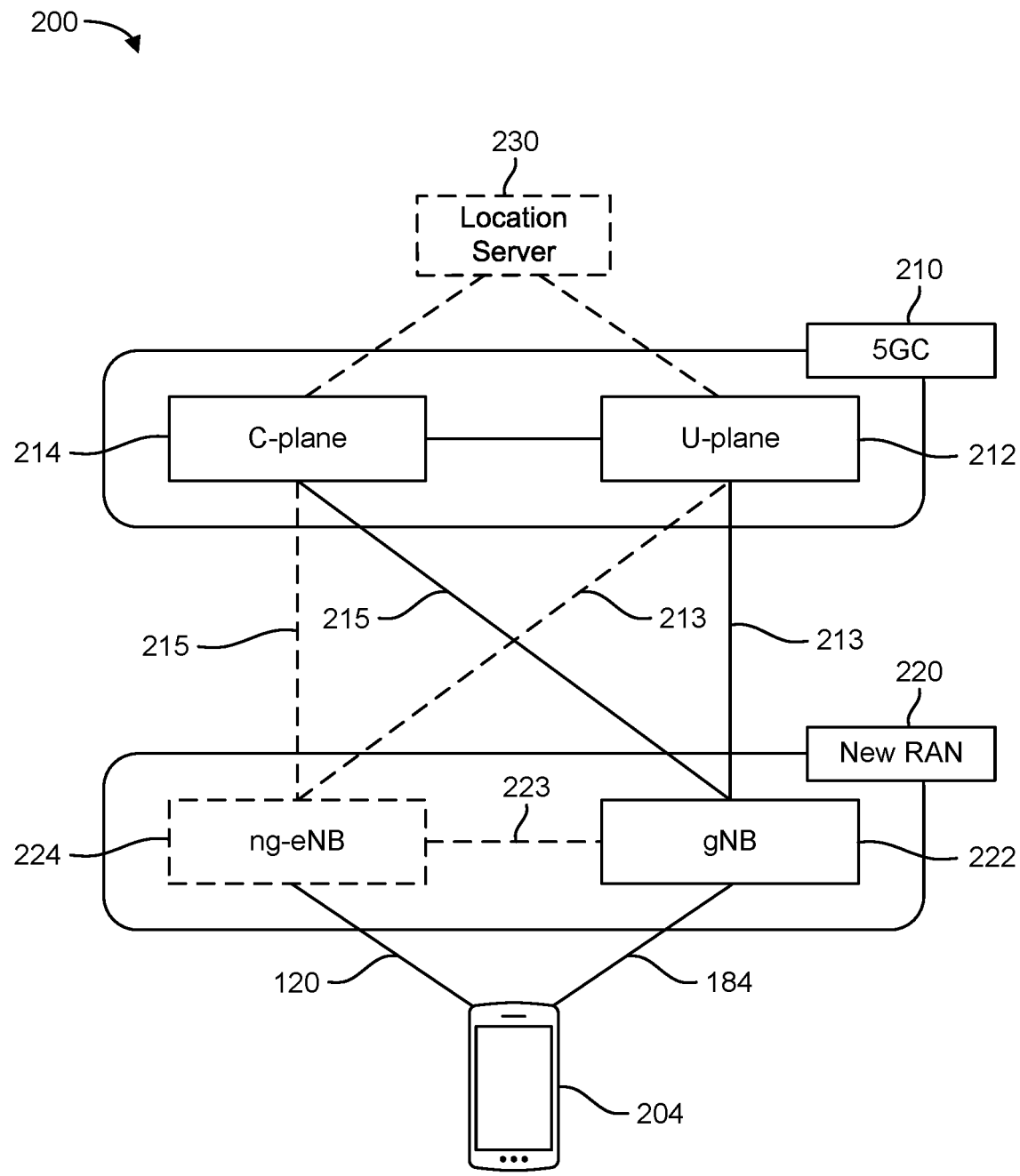
FIGS. 2A and 2B illustrate example wireless network structures, according to various aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
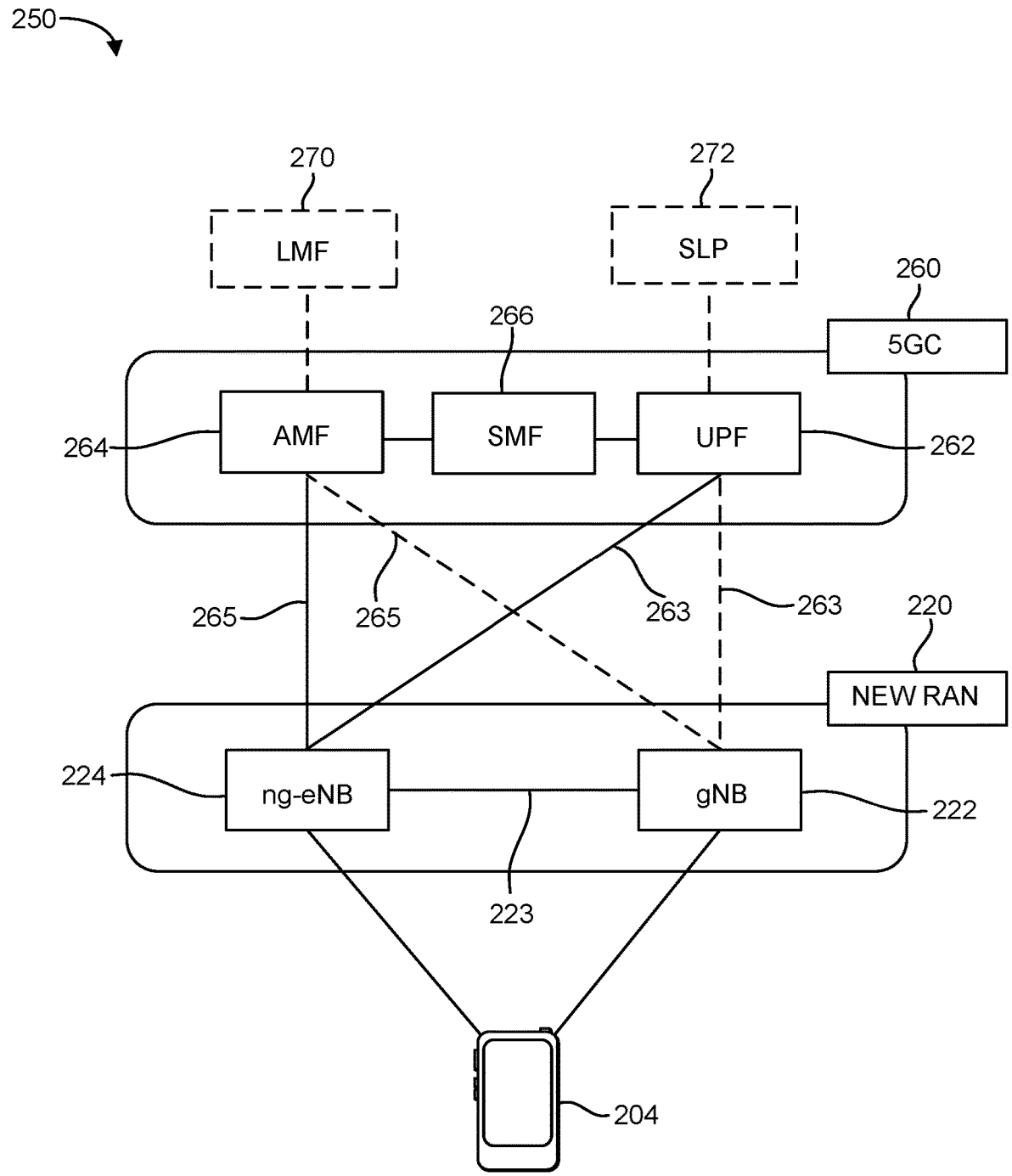

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node. The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
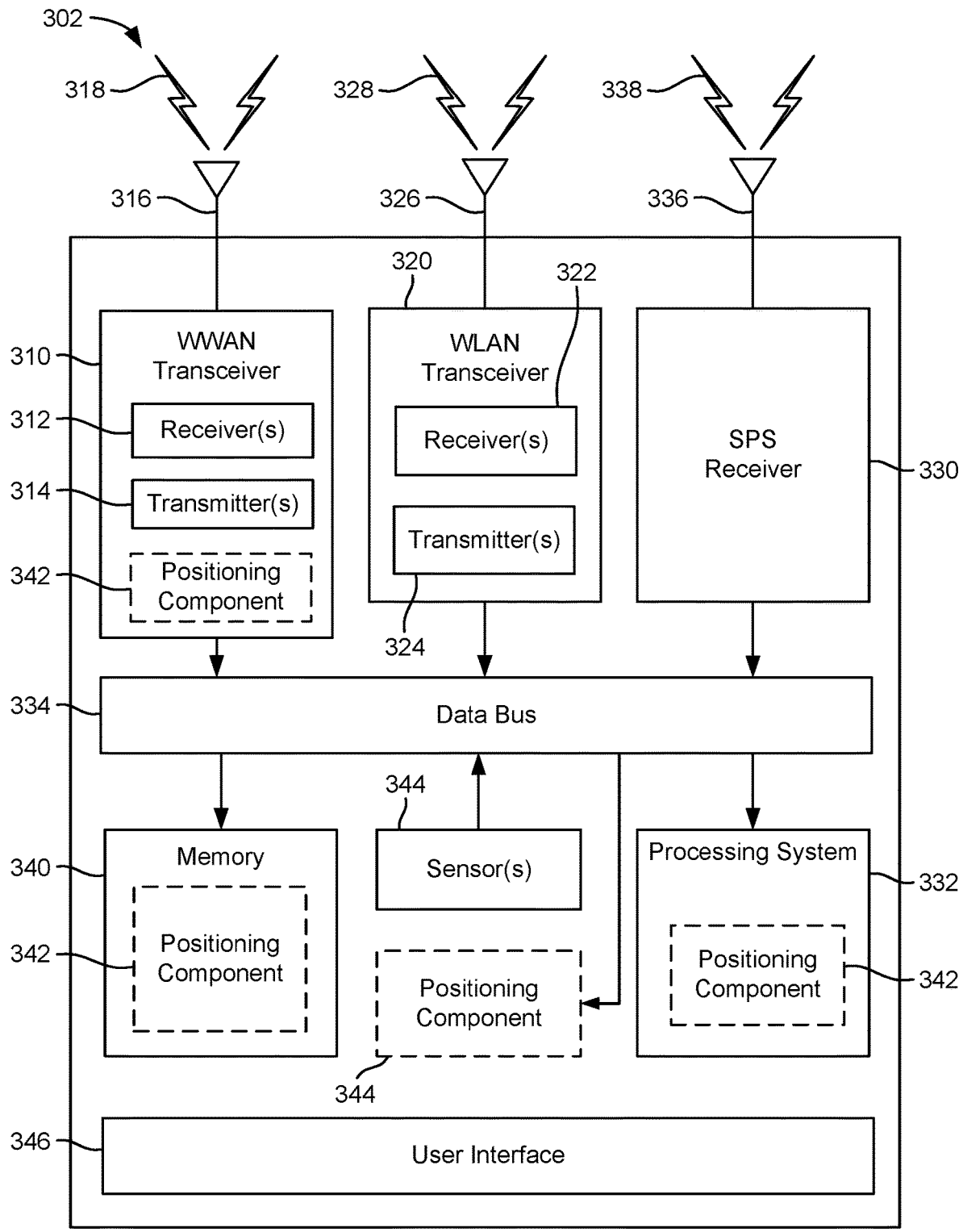
FIGS. 3A to 3C are simplified block diagrams of several sample aspects of components that may be employed in a user equipment (UE), a base station, and a network entity, respectively, and configured to support communications as taught herein.
Figure 3B:
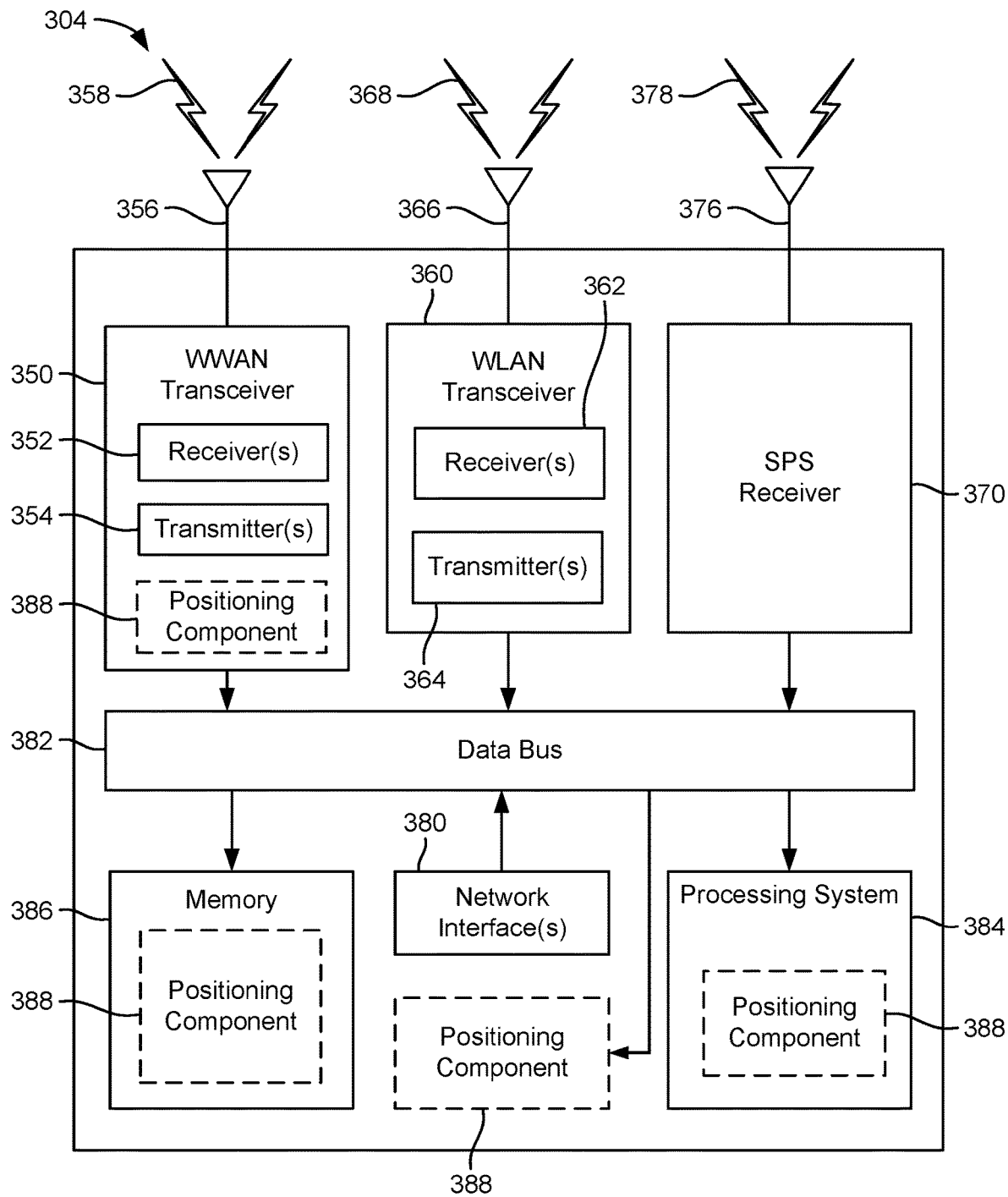
Figure 3C:
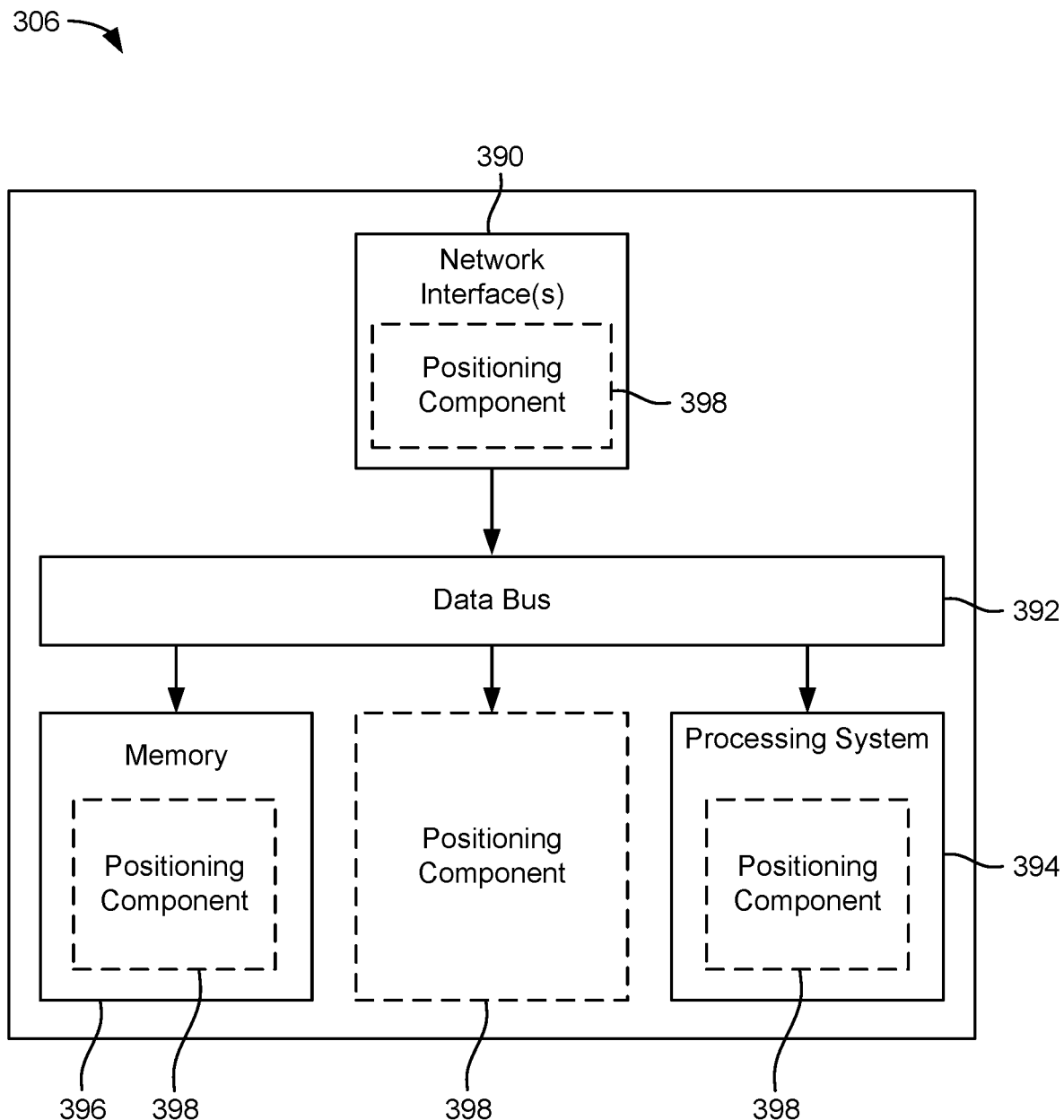

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the WLAN transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320 and/or 350 and 360) of the UE 302 and/or the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, and may provide means for receiving and/or measuring SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390, respectively, providing means for communicating (e.g., means for transmitting, means for receiving, etc.) with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, wireless communication, and for providing other processing functionality. The base station 304 includes a processing system 384 for providing functionality relating to, for example, wireless communication as disclosed herein, and for providing other processing functionality. The network entity 306 includes a processing system 394 for providing functionality relating to, for example, wireless communication as disclosed herein, and for providing other processing functionality. The processing systems 332, 384, and 394 may therefore provide means for processing, such as means for determining, means for calculating, means for receiving, means for transmitting, means for indicating, etc. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). The memory components 340, 386, and 396 may therefore provide means for storing, means for retrieving, means for maintaining, etc. In some cases, the UE 302, the base station 304, and the network entity 306 may include positioning components 342, 388, and 398, respectively. The positioning components 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the positioning components 342, 388, and 398 may be external to the processing systems 332, 384, and 394 (e.g., part of a modem processing system, integrated with another processing system, etc.). Alternatively, the positioning components 342, 388, and 398 may be memory modules stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein. FIG. 3A illustrates possible locations of the positioning component 342, which may be part of the WWAN transceiver 310, the memory component 340, the processing system 332, or any combination thereof, or may be a standalone component. FIG. 3B illustrates possible locations of the positioning component 388, which may be part of the WWAN transceiver 350, the memory component 386, the processing system 384, or any combination thereof, or may be a standalone component. FIG. 3C illustrates possible locations of the positioning component 398, which may be part of the network interface(s) 390, the memory component 396, the processing system 394, or any combination thereof, or may be a standalone component.

The UE 302 may include one or more sensors 344 coupled to the processing system 332 to provide means for sensing or detecting movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 (L3) and Layer-2 (L2) functionality.

In the uplink, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the downlink transmission by the base station 304, the processing system 332 provides RRC layer functionality associated with system information (e.g., MIB, SIBS) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARM), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316.

The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the uplink, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the positioning components 342, 388, and 398, etc.

Figure 4A:
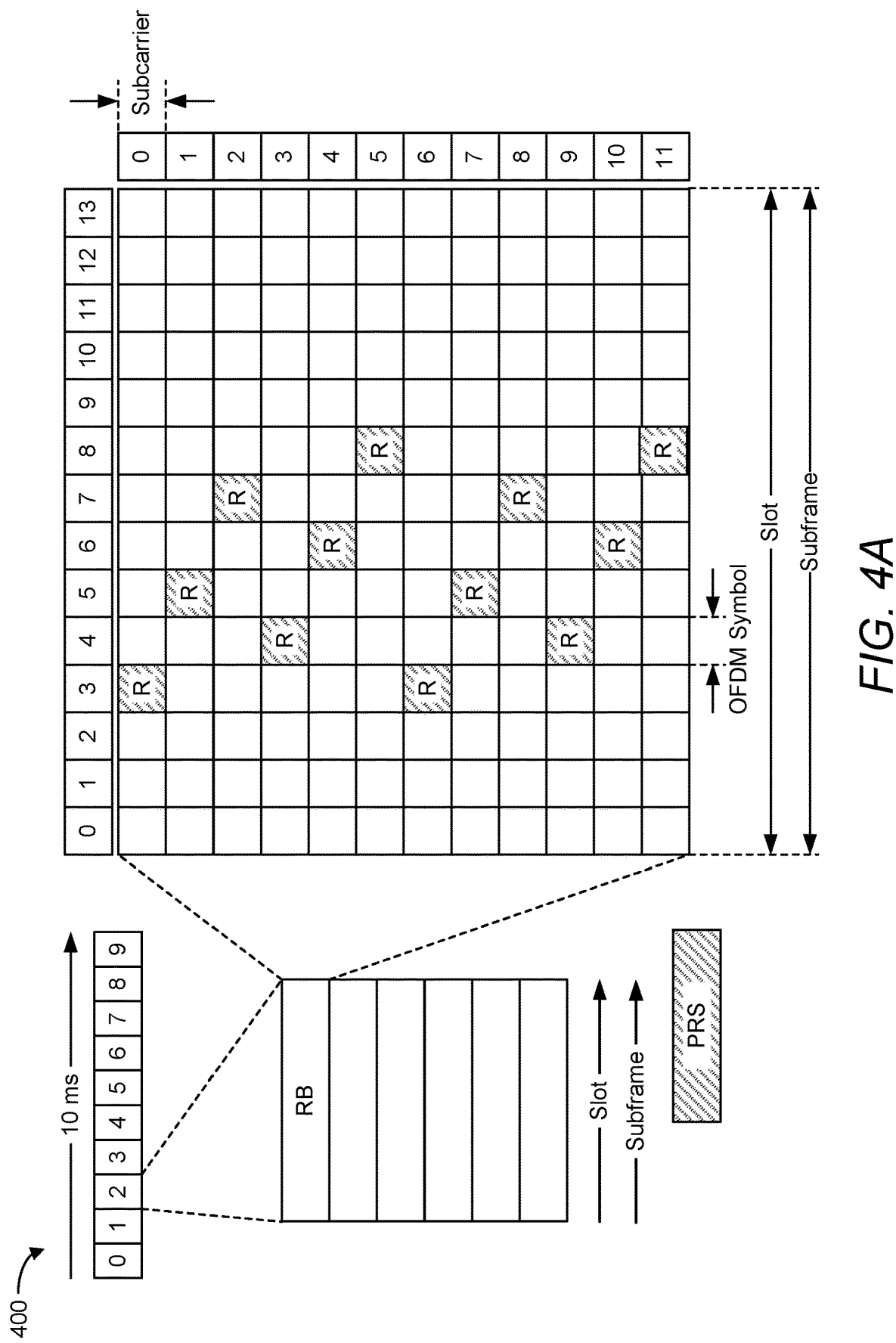
FIGS. 4A and 4B are diagrams illustrating examples of frame structures and channels within the frame structures, according to aspects of the disclosure.
Figure 4B:
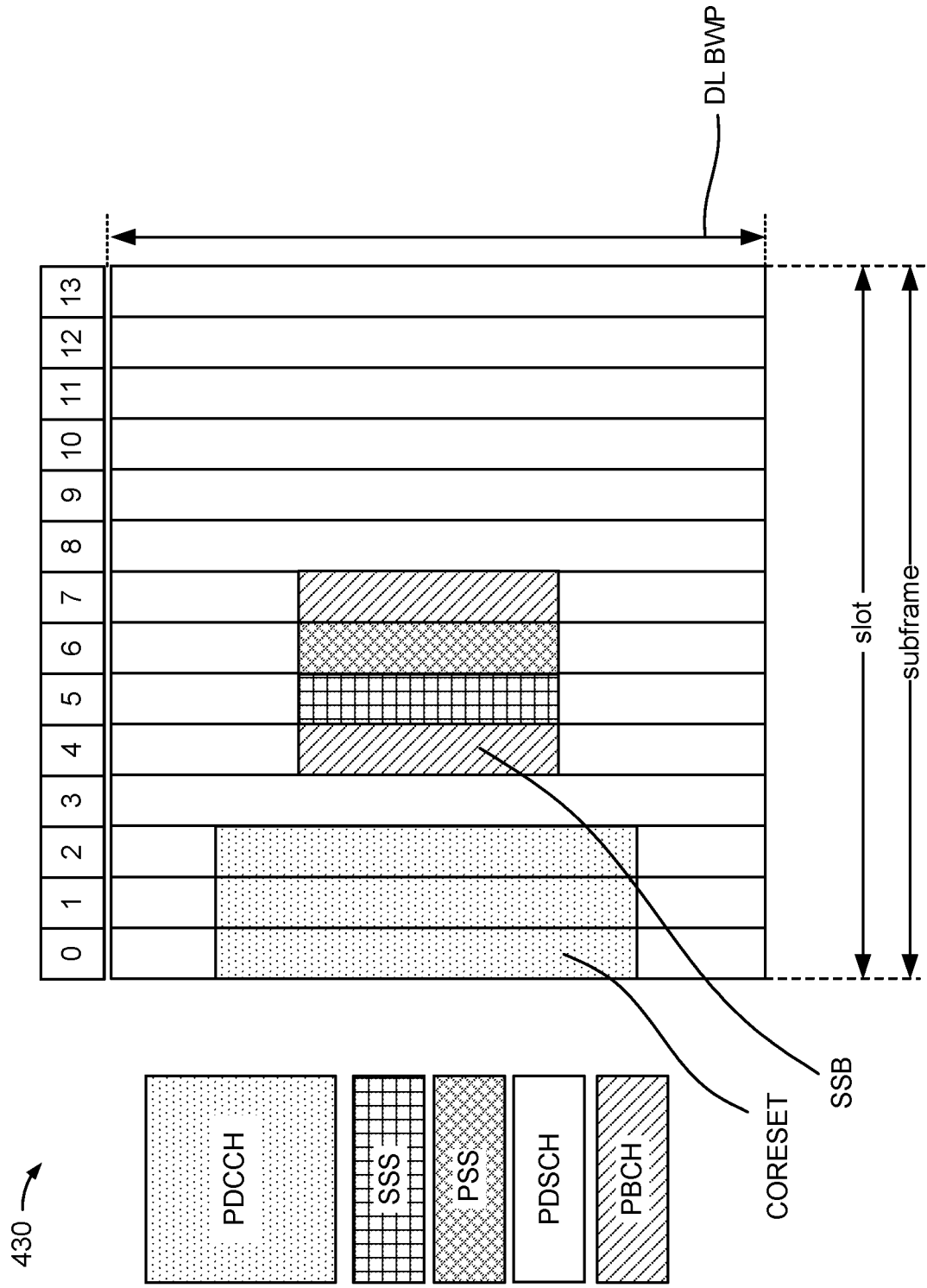

Various frame structures may be used to support downlink and uplink transmissions between network nodes (e.g., base stations and UEs). FIG. 4A is a diagram 400 illustrating an example of a downlink frame structure, according to aspects of the disclosure. FIG. 4B is a diagram 430 illustrating an example of channels within the downlink frame structure, according to aspects of the disclosure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing, symbol length, etc.). In contrast, NR may support multiple numerologies (μ), for example, subcarrier spacing of 15 kHz, 30 kHz, 60 kHz, 120 kHz, and 240 kHz or greater may be available. Table 1 provided below lists some various parameters for different NR numerologies.

TABLE 1

| μ | SCS (kHz) | Symbols/ Slot | Slots/ Subframe | Slots/ Frame | Slot Duration (ms) | Symbol Duration (μs) | Max. nominal system BW (MHz) with 4 K FFT size |
|---|---|---|---|---|---|---|---|
| 0 | 15 | 14 | 1 | 10 | 1 | 66.7 | 50 |
| 1 | 30 | 14 | 2 | 20 | 0.5 | 33.3 | 100 |
| 2 | 60 | 14 | 4 | 40 | 0.25 | 16.7 | 100 |
| 3 | 120 | 14 | 8 | 80 | 0.125 | 8.33 | 400 |
| 4 | 240 | 14 | 16 | 160 | 0.0625 | 4.17 | 800 |

In the examples of FIGS. 4A and 4B, a numerology of 15 kHz is used. Thus, in the time domain, a 10 millisecond (ms) frame is divided into 10 equally sized subframes of 1 ms each, and each subframe includes one time slot. In FIGS. 4A and 4B, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIGS. 4A and 4B, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs carry downlink reference (pilot) signals (DL-RS). The DL-RS may include PRS, TRS, PTRS, CRS, CSI-RS, DMRS, PSS, SSS, SSB, etc. FIG. 4A illustrates example locations of REs carrying PRS (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration. Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-6 (which spans six symbols). That is, the locations of the shaded REs (labeled "R") indicate a comb-6 PRS resource configuration.

A "PRS resource set" is a set of PRS resources used for the transmission of PRS signals, where each PRS resource has a PRS resource identifier (ID). In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as PRS-ResourceRepetitionFactor) across slots. The periodicity is the time from the first repetition of the first PRS resource of a first PRS instance to the same first repetition of the same first PRS resource of the next PRS instance. The periodicity may have a length selected from $2^\mu \cdot \{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from $\{1, 2, 4, 6, 8, 16, 32\}$ slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing (SCS) and cyclic prefix (CP) type (meaning all numerologies supported for the PDSCH are also supported for PRS), the same Point A, the same value of the downlink PRS bandwidth, the same start PRB (and center frequency), and the same comb-size. The Point A parameter takes the value of the parameter ARFCN-ValueNR (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

FIG. 4B illustrates an example of various channels within a downlink slot of a radio frame. In NR, the channel bandwidth, or system bandwidth, is divided into multiple BWPs. A BWP is a contiguous set of PRBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries an MIB, may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE. Multiple (such as up to eight) DCIs can be configured in the PDCCH, and these DCIs can have one of multiple formats. For example, there are different DCI formats for uplink scheduling, for non-MIMO downlink scheduling, for MIMO downlink scheduling, and for uplink power control. A PDCCH may be transported by 1, 2, 4, 8, or 16 CCEs in order to accommodate different DCI payload sizes or coding rates.

Note that the terms "positioning reference signal" and "PRS" generally refer to specific reference signals that are used for positioning in LTE and NR systems. However, as used herein, the terms "positioning reference signal" and "PRS" may also refer to any type of reference signal that can be used for positioning, such as but not limited to, PRS, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, depending on the context. When needed for clarity, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., PRS, TRS, CSI-RS, SSB, etc.) received from pairs of base stations, referred to as reference signal time difference (RSTD) or time difference of arrival (TDOA) measurements, and reports them to a positioning entity. More specifically, the UE receives the identifiers of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity can estimate the UE's location. For DL-AoD positioning, a base station measures the angle and other channel properties (e.g., signal strength) of the downlink transmit beam used to communicate with a UE to estimate the location of the UE.

Uplink-based positioning methods include uplink time difference of arrival (UL-TDOA) and uplink angle-of-arrival (UL-AoA). UL-TDOA is similar to DL-TDOA, but is based on uplink reference signals (e.g., SRS) transmitted by the UE. For UL-AoA positioning, a base station measures the angle and other channel properties (e.g., gain level) of the uplink receive beam used to communicate with a UE to estimate the location of the UE.

Downlink-and-uplink-based positioning methods include enhanced cell-ID (E-CID) positioning and multi-round-trip-time (RTT) positioning (also referred to as "multi-cell RTT"). In an RTT procedure, an initiator (a base station or a UE) transmits an RTT measurement signal (e.g., a PRS or SRS) to a responder (a UE or base station), which transmits an RTT response signal (e.g., an SRS or PRS) back to the initiator. The RTT response signal includes the difference between the ToA of the RTT measurement signal and the transmission time of the RTT response signal, referred to as the reception-to-transmission (Rx-Tx) measurement. The initiator calculates the difference between the transmission time of the RTT measurement signal and the ToA of the RTT response signal, referred to as the "Tx-Rx" measurement. The propagation time (also referred to as the "time of flight") between the initiator and the responder can be calculated from the Tx-Rx and Rx-Tx measurements. Based on the propagation time and the known speed of light, the distance between the initiator and the responder can be determined. For multi-RTT positioning, a UE performs an RTT procedure with multiple base stations to enable its location to be triangulated based on the known locations of the base stations. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base stations.

To assist positioning operations, a location server (e.g., location server 230, LMF 270) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier (ID), reference signal bandwidth, etc.), and/or other parameters applicable to the particular positioning method. Alternatively, the assistance data may originate directly from the base stations themselves (e.g., in periodically broadcasted overhead messages, etc.). in some cases, the UE may be able to detect neighbor network nodes itself without the use of assistance data.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 5:
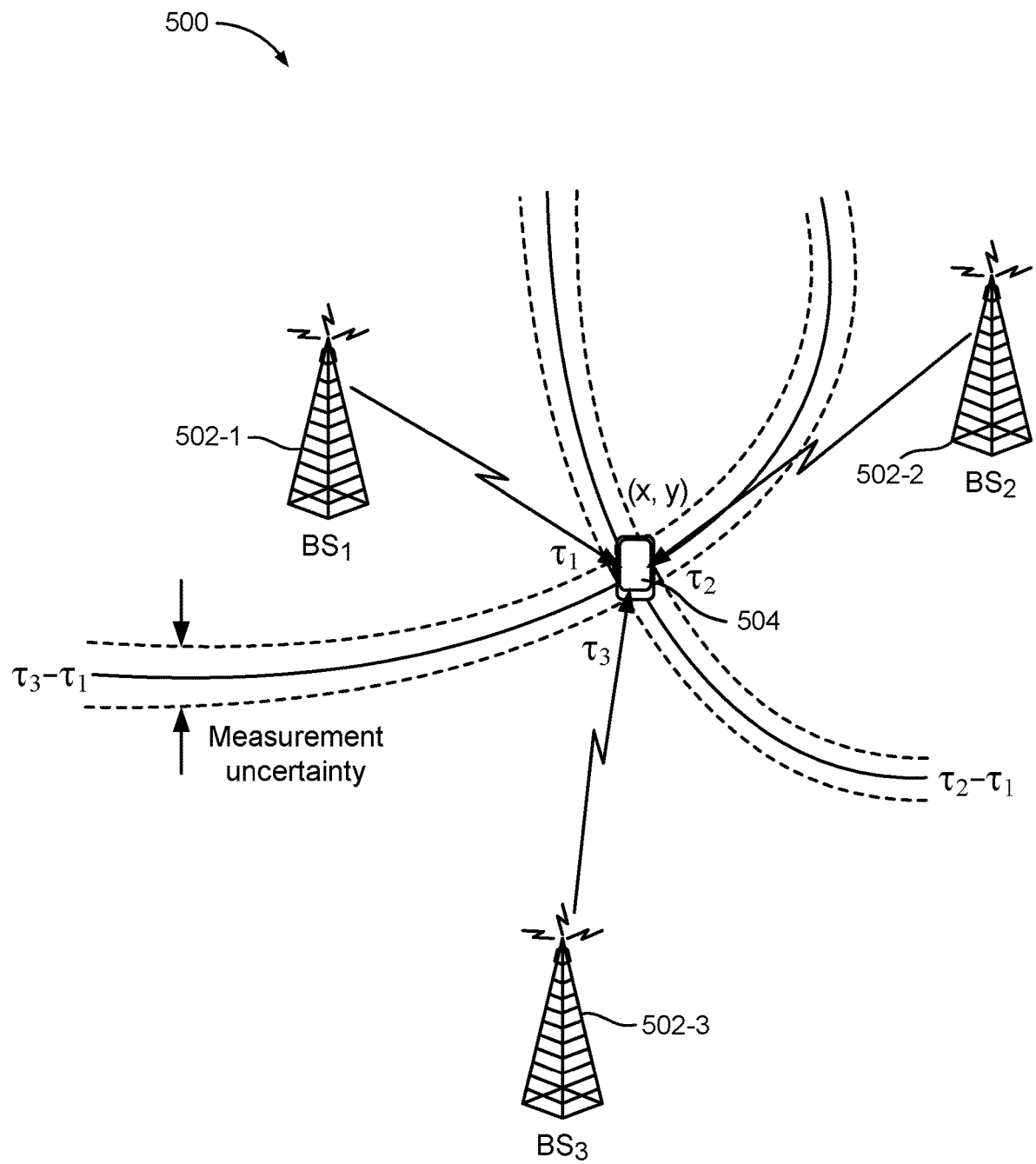
FIG. 5 is a diagram illustrating an example technique for determining a location of a mobile device using information obtained from a plurality of base stations.

As a specific example, FIG. 5 illustrates a DL-TDOA positioning procedure in an example wireless communications system 500, according to aspects of the disclosure. In the example of FIG. 5, a UE 504 (e.g., any of the UEs described herein) is attempting to calculate an estimate of its location, or assist another entity (e.g., a base station or core network component, another UE, a location server, a third party application, etc.) to calculate an estimate of its location. The UE 504 may communicate wirelessly with a plurality of base stations 502-1, 502-2, and 502-3 (collectively, base stations 502), which may correspond to any combination of the base stations described herein, using RF signals and standardized protocols for the modulation of the RF signals and the exchange of information packets. By extracting different types of information from the exchanged RF signals, and utilizing the layout of the wireless communications system 500 (e.g., the base stations' 502 locations, geometry, etc.), the UE 504 may determine its location, or assist in the determination of its location, in a predefined reference coordinate system. In an aspect, the UE 504 may specify its location using a two-dimensional (2D) coordinate system; however, the aspects disclosed herein are not so limited, and may also be applicable to determining locations using a three-dimensional (3D) coordinate system, if the extra dimension is desired. Additionally, while FIG. 5 illustrates one UE 504 and three base stations 502, as will be appreciated, there may be more UEs 504 and more or fewer base stations 502.

To support location estimates, the base stations 502 may be configured to broadcast positioning reference signals (e.g., PRS, TRS, CRS, CSI-RS, etc.) to UEs 504 in their coverage area to enable a UE 504 to measure characteristics of such reference signals. For example, as described above, the DL-TDOA positioning method is a multi-lateration method in which the UE 504 measures the time difference, known as an RSTD, between specific downlink reference signals (e.g., PRS, TRS, CRS, CSI-RS, etc.) transmitted by different pairs of base stations 502, and either reports these RSTD measurements to a location server (e.g., location server 230, LMF 270, SLP 272) or computes a location estimate itself from these RSTD measurements.

Generally, RSTDs are measured between a reference cell (e.g., a cell supported by base station 502-1 in the example of FIG. 5) and one or more neighbor cells (e.g., cells supported by base stations 502-2 and 502-3 in the example of FIG. 5). The reference cell remains the same for all RSTDs measured by the UE 504 for any single positioning use of DL-TDOA and would typically correspond to the serving cell for the UE 504 or another nearby cell with good signal strength at the UE 504. In an aspect, the neighbor cells would normally be cells supported by base stations different from the base station for the reference cell, and may have good or poor signal strength at the UE 504. The location computation can be based on the measured time differences (e.g., RSTDs) and knowledge of the involved base stations' 502 locations and relative transmission timing (e.g., regarding whether base stations 502 are accurately synchronized or whether each base station 502 transmits with some known time difference relative to other base stations 502).

To assist positioning operations, the location server (e.g., location server 230, LMF 270, SLP 272) may provide DL-TDOA assistance data to the UE 504 for the reference cell and the neighbor cells relative to the reference cell. For example, the assistance data may include identifiers (e.g., PCI, VCI, CGI, etc.) for each cell of a set of cells that the UE 504 is expected to measure (here, cells supported by the base stations 502). The assistance data may also provide the center channel frequency of each cell, various reference signal configuration parameters (e.g., the number of consecutive positioning subframes, periodicity of positioning subframes, muting sequence, frequency hopping sequence, reference signal identifier, reference signal bandwidth), and/or other cell related parameters applicable to DL-TDOA. The DL-TDOA assistance data may indicate the serving cell for the UE 504 as the reference cell.

In some cases, DL-TDOA assistance data may also include "expected RSTD" parameters, which provide the UE 504 with information about the RSTD values the UE 504 is expected to measure at its current location between the reference cell and each neighbor cell, together with an uncertainty of the expected RSTD parameter. The expected RSTD, together with the associated uncertainty, may define a search window for the UE 504 within which the UE 504 is expected to measure the RSTD value. DL-TDOA assistance information may also include reference signal configuration information parameters, which allow a UE 504 to determine when a reference signal positioning occasion occurs on signals received from various neighbor cells relative to reference signal positioning occasions for the reference cell, and to determine the reference signal sequence transmitted from various cells in order to measure a reference signal ToA or RSTD.

In an aspect, while the location server (e.g., location server 230, LMF 270, SLP 272) may send the assistance data to the UE 504, alternatively, the assistance data can originate directly from the base stations 502 themselves (e.g., in periodically broadcasted overhead messages, etc.). Alternatively, the UE 504 can detect neighbor base stations itself without the use of assistance data.

The UE 504 (e.g., based in part on the assistance data, if provided) can measure and (optionally) report the RSTDs between reference signals received from pairs of base stations 502. Using the RSTD measurements, the known absolute or relative transmission timing of each base station 502, and the known location(s) of the reference and neighboring base stations 502, the network (e.g., location server 230/LMF 270/SLP 272, a base station 502) or the UE 504 may estimate the location of the UE 504. More particularly, the RSTD for a neighbor cell "k" relative to a reference cell "Ref" may be given as $(ToA_k - ToA_{Ref})$, where the ToA values may be measured modulo one subframe duration (1 ms) to remove the effects of measuring different subframes at different times. In the example of FIG. 5, the measured time differences between the reference cell of base station 502-1 and the cells of neighboring base stations 502-2 and 502-3 are represented as $\tau_2 - \tau_1$ and $\tau_3 - \tau_1$, where $\tau_1$, $\tau_2$, and $\tau_3$ represent the ToA of a reference signal from the transmitting antenna(s) of base station 502-1, 502-2, and 502-3, respectively. The UE 504 may then convert the ToA measurements for different network nodes to RSTD measurements and (optionally) send them to the location server. Using (i) the RSTD measurements, (ii) the known absolute or relative transmission timing of each base station 502, (iii) the known location(s) of the physical TRPs for the reference and neighboring base stations 502, and/or (iv) directional reference signal characteristics, such as the direction of transmission, the UE's 504 location may be determined (either by the UE 504 or the location server).

Still referring to FIG. 5, when the UE 504 obtains a location estimate using DL-TDOA measured time differences, the necessary additional data (e.g., the base stations' 502 locations and relative transmission timing) may be provided to the UE 504 by the location server. In some implementations, a location estimate for the UE 504 may be obtained (e.g., by the UE 504 itself or by the location server) from DL-TDOA measured time differences and from other measurements made by the UE 504 (e.g., measurements of signal timing from GPS or other global navigation satellite system (GNSS) satellites). In these implementations, known as hybrid positioning, the DL-TDOA measurements may contribute towards obtaining the UE's 504 location estimate but may not wholly determine the location estimate.

As discussed above, in some cases, a UE may be able to calculate an estimate its own location, rather than reporting positioning measurements to a positioning entity (e.g., location server 230, LMF 270, SLP 272) and the positioning entity estimating the location of the UE. This is referred to as "UE-based" positioning, versus "UE-assisted" positioning. UE-based positioning has a number of advantages: it enables new use cases, enables improved performance of existing use cases, has improved scalability, improved operational range, low uplink overhead, low latency, very low specifications impact, and parity with RAT-independent UE-based features.

To support the high accuracy (horizontal and vertical), low latency, network efficiency (scalability, signaling overhead, etc.), and device efficiency (power consumption, hardware complexity, etc.) needed for commercial uses cases (e.g., factory automation, indoor navigation, etc.), there is a need for improved signaling and positioning procedures. Accordingly, the present disclosure provides additional UE signaling to support bias detection in positioning procedures.

There are a number of parameters that influence the accuracy of UE-based TDOA (OTDOA and DL-TDOA) positioning. For example, the involved base stations (and corresponding TRPs) should be tightly synchronized and their locations should be accurately known. In addition, phase alignment for PRS stitching can improve performance. In an aspect, a UE can perform what is referred to herein as "nuisance parameter tracking" and "change point detection," where, if the UE detects an event that can bias the location estimation, it can report that event to the associated TRP, the serving TRP, and/or the location server, as appropriate. Such events include a base station falling out of synchronization with other base stations, a timing bias occurring at the TRP ID, PRS ID, and/or frequency layer ID level due to calibration errors in the TRP, an inaccurate base station location, a phase and/or power difference in different PRS (which affects PRS stitching), a failure of the polarization verification to detect the non-line of sight (NLOS) path(s) between the UE and a base station, and the like.

Some of the above events are considered "dynamic," and others "static." A dynamic event is one that occurs during a positioning session, whereas a static event is one that is present from the beginning of a positioning session. Thus, a base station falling out of synchronization with other base stations or a polarization verification failure are examples of dynamic events, as they are more likely to occur during a positioning session. In contrast, a timing bias at the TRP ID, PRS ID, and/or frequency layer ID level, an inaccurate base station location, or a phase and/or power difference in different PRS are examples of static events, as they are more likely to be present at the beginning of a positioning session.

A base station falling out of synchronization can introduce a bias (or inaccuracy) in a location estimate because, as noted above, base stations need to be tightly synchronized with each other (meaning the start of a radio frame should occur at the exact same time across base stations) in order for the UE to accurately calculate the RSTD between different base stations, as described above with reference to FIG. 5. If a measured base station is out of synchronization, the resulting RSTD measurement will be incorrect.

A timing bias at the TRP ID, PRS ID, and/or frequency layer ID level due to calibration errors in the TRP means that the transmissions from a particular TRP, for a particular PRS or a particular frequency layer, are different than expected due to a mis-calibration. As will be appreciated, this can cause an inaccurate location estimate because the UE is expecting one thing but receiving another.

An inaccurate base station location can cause an error in location estimation because, as described above with reference to FIG. 5, the UE's location is determined based on the locations of the involved base stations. If one or more of those locations is incorrect, the final location of the UE may be incorrect.

In PRS stitching, a UE measures PRS on different bandwidths and combines, or "stitches," the different PRS together across the different bandwidths so that it seems as though the PRS covers a larger bandwidth. Measuring a larger bandwidth signal improves measurement accuracy. However, if the phase (i.e., the position of a point in time on a waveform cycle) and/or power difference of one or more of the PRS are wrong, it introduces an error/bias when stitching the PRS together.

Regarding polarization verification, the polarization of a signal (e.g., a PRS) changes based on whether the signal followed the line of sight (LOS) path or an NLOS path from the transmitter to the receiver. The UE may be provided with the expected polarization (e.g., the polarization with which the signal was transmitted), and if the polarization of the received signal does not match the expected polarization, the UE can determine that the received signal did not follow the LOS path. However, if the polarization with which the base station actually transmits a signal is different than the expected polarization (e.g., due to some calibration error), the UE may incorrectly identify the signal as following an NLOS when it followed the LOS, or vice versa.

The UE can detect the various causes of bias described above using techniques such as Kalman filtering. Kalman filtering, also known as linear quadratic estimation (LQE), uses a series of measurements observed over time, containing statistical noise and other inaccuracies, and produces estimates of unknown variables. By estimating a joint probability distribution over the variables for each timeframe, the estimates tend to be more accurate than those based on a single measurement alone. A Kalman filter works in two-step. In the prediction step, the Kalman filter produces estimates of the current state variables, along with their uncertainties. Once the outcome of the next measurement (having some amount of error, including random noise) is observed, these estimates are updated using a weighted average, with more weight being given to estimates with higher certainty.

In the present case, a UE can use a Kalman filter to perform "nuisance parameter tracking" and "change point detection." More specifically, the UE can use a Kalman filter to model the expected values of various parameters related to base station synchronization, TRP ID, PRS ID, and/or frequency layer ID timing, base station location, a phase and/or power difference in different PRS, polarization, and the like. If any of these parameters (referred to as "nuisance parameters") changes more than a threshold from its expected value (as predicted by the Kalman filter), it may indicate that a bias event has occurred. This is referred to as "change point detection." The UE can then report the event as appropriate.

For example, to track base station synchronization, the UE may monitor the ToA of reference signals received from multiple base stations, and if the ToA of reference signals from a particular base station start to drift from the expected values (as predicted by the Kalman filter), it may indicate that the base station is out of synchronization. The UE can then report the event to the offending base station, or, if it does not have a communication link to that base station, to its serving base station, which can relay the message to the offending base station over a backhaul link (e.g., the X2 interface).

In some case, the UE may not know the specific cause of the bias. For example, if the UE determines that the ToA of reference signals from a particular base station are not within the expected range, it may not know whether the problem is that the base station is out of synchronization with the other base stations or that the location of the base station (as received from the base station or in TDOA assistance data) is wrong. However, the UE can still report (to the offending base station or its serving base station) that there is an issue, and the offending base station can attempt to diagnose the issue itself.

When the UE has identified a bias event and an offending base station, it can report the event to the offending base station if it has a communication link to that base station. If it does not, the UE can report the event to its serving base station, which can relay the report to the offending base station (e.g., over a backhaul link) and/or the location server (e.g., over LTE positioning protocol type A (LPPa) or NR positioning protocol type A (NRPPs)). In some cases, the serving base station may simply relay the report to the location server as one of multiple bias event reports from multiple UEs, and the location server can determine how to address the reported issues. The UE may also send the bias report directly to the location server (e.g., over LPP). This may be in addition to or instead of sending the report to the offending and/or serving base stations.

In an aspect, a bias event report may include a bit flag indicator (e.g., a single bit indicating whether or not a bias event has been detected), the beam ID and/or PRS resource ID of the beam or PRS resource that triggered the event, the base station and/or TRP ID of the base station and/or TRP that triggered the event, or any combination thereof. In an aspect, the information reported may depend on the type of bias event and/or the UE's ability to detect the bias event. Each bias event report may also include a timestamp indicating when the event occurred or was detected. For example, the timestamp could be the SFN or slot ID during which the event occurred/was detected, or a time range (with a start and end time) during which the event occurred or was detected.

Upon receiving a bias event report from a UE (either directly or via the UE's serving base station or the location server), the offending base station can interact with the location server or directly with other base stations to decide whether to trust what the UE has reported and adjust itself, or dismiss the report. In an aspect, the base station can decide whether or not to trust a UE based on the number of UEs that report the same event within some period of time.

If a sufficient number (i.e., above some threshold) of UEs report the same bias event within a threshold period of time, the offending base station can consider the reports trustworthy and take corrective action (e.g., resynchronizing with the other base stations).

If, however, the base station is not confident about adjusting its timing (e.g., due to an insufficient number of UEs reporting the bias event), it could instead signal to other UEs in the vicinity that are currently performing positioning procedures about a "possible clock drift." That is, the base station may broadcast a message indicating that its clock time may be incorrect and including an amount of the clock drift that may have occurred (derived from the bias event report). The UEs currently performing positioning procedures can then calculate their locations both with and without adjusting for the base station's possible clock drift, and report whether or not adjusting for the possible clock drift improved their perceived positioning accuracy. If it did, the base station can resynchronize its clock. If it did not, the base station can ignore the bias event report.

If the location server is receiving the bias event reports, it can act similarly to the base station. That is, if a sufficient number (i.e., above some threshold) of UEs report the same bias event about the same base station within some period of time, the location server can consider the reports trustworthy and instruct the offending base station to take corrective action (e.g., resynchronizing with the other base stations). Or, if the location server is not confident about the bias event report (e.g., due to an insufficient number of UEs reporting the bias event), it could instead instruct the base station to broadcast a message indicating that its clock time may be incorrect and including an amount of the clock drift that may have occurred. Then, as described above, any UEs currently performing positioning procedures can calculate their locations both with and without adjusting for the base station's possible clock drift and report which provided better positioning accuracy.

In an aspect, a UE detecting a bias event may also report that event directly to other UEs in the vicinity. For example, the UE could broadcast a message on a control or data sidelink channel, such as a physical sidelink shared channel (PSSCH). If the receiving UE(s) do not trust the reporting UE, they can attempt to detect the bias event themselves, or calculate their locations with and without adjusting for the bias event and determine which provided better positioning accuracy. If the receiving UE(s) do trust the reporting UE, however, they can simply compensate for the bias event in their own positioning sessions, with or without attempting to detect the bias themselves or calculating their locations with and without adjusting for the bias event to determine which provides better positioning accuracy.

Figure 6:
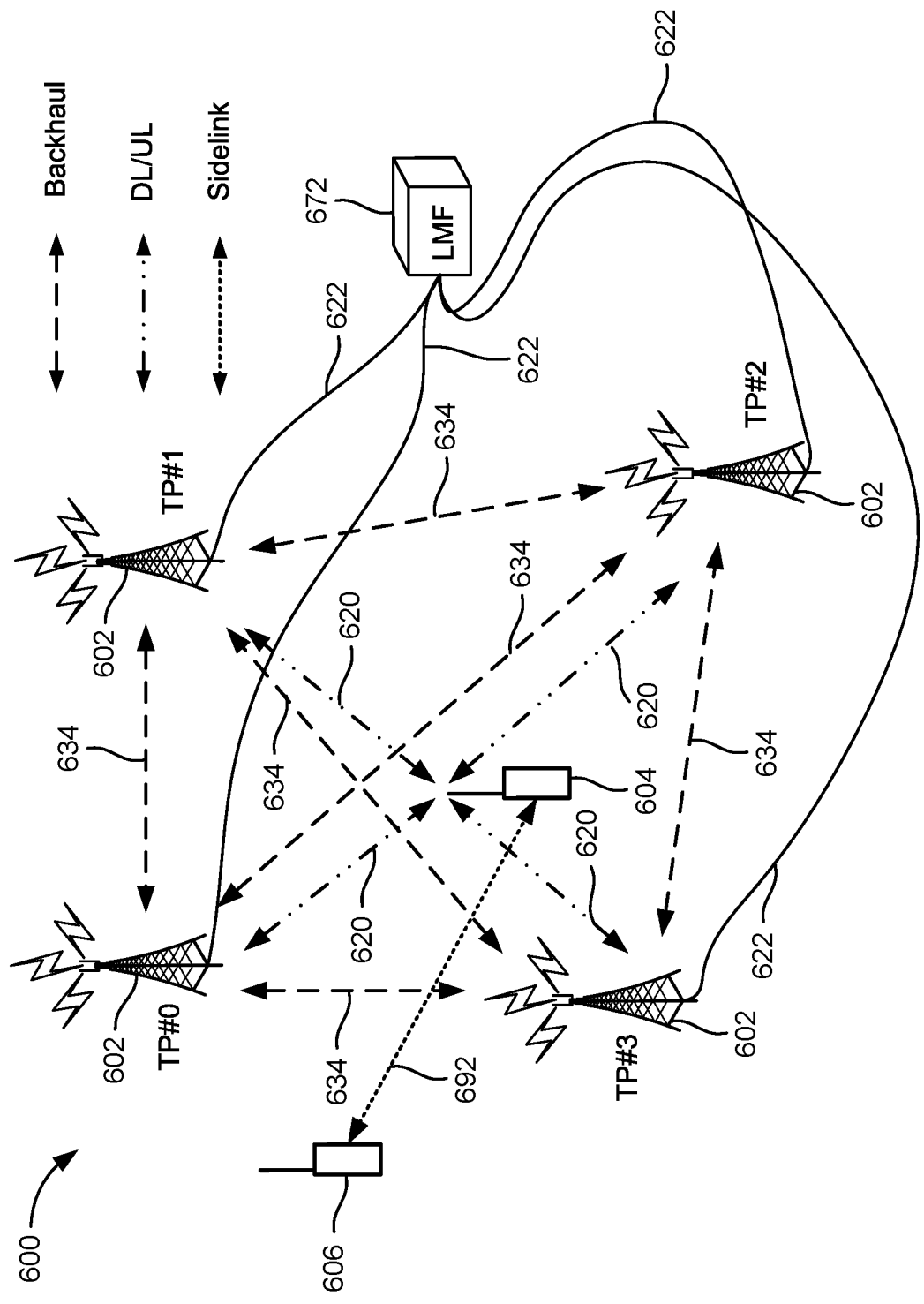
FIG. 6 is a diagram illustrating the techniques described herein.

FIG. 6 is a diagram 600 illustrating the techniques described herein. In the example of FIG. 6, a UE 604 (e.g., any of the UEs described herein) is involved in a positioning session with four TRPs 602 (labeled "TRP #0," "TRP #1," "TRP #2," and "TRP #3"), one of which may be a serving TRP. Each TRP 602 may correspond to a different base station (e.g., any of the base stations described herein). The UE 604 may receive/measure reference signals (e.g., PRS) from the TRPs 602 over wireless links 620, which may correspond, at least in some cases, to communication links 120 in FIG. 1. Note that there may not be communication links between the UE 604 and each TRP 602 at all times. Rather, there may only be communication links between the UE 604 and one or more serving TRPs 602 (e.g., more than one in the case of a PCell and one or more SCells).

The TRPs 602 may communicate with each other over backhaul links 634 (which may correspond to backhaul links 134 in FIG. 1), and with an LMF 672 (e.g., LMF 270) over backhaul links 622 (which may correspond to backhaul links 122 in FIG. 1). Note that although FIG. 6 illustrates an LMF 672, it may be any type of positioning entity that provides location server functionality.

In the example of FIG. 6, the UE 604 is moving from one location to another (e.g., is being carried by a pedestrian, is in or part of a vehicle, etc.) and is tracking its location as it moves. The UE 604 may perform TDOA (e.g., RSTD) measurements of reference signals (e.g., PRS) received from pairs of TRPs 602 to determine its location as it moves. The UE 604 may also use a Kalman filter to track the various nuisance parameters described above. If the UE 604 detects a bias event associated with one or more of the TRPs 602, as described above, the UE 604 can report the event to the offending TRP 602 (if the respective link 620 is a communication link between the UE 604 and the offending TRP 602, which may not be the case if the offending TRP 602 is not the serving TRP 602), the serving TRP 602 (e.g., if there is not a communication link between the UE 604 and the offending TRP 602), and/or the LMF 672, as described above. It can also broadcast the event over a wireless sidelink 692 (which may correspond to D2D P2P link 192) to a connected UE 606 (e.g., any of the UEs described herein), as described above.

Upon reception of the bias event report, the TRP 602 (whether the offending TRP 602 or the serving TRP 602 or both) can ignore the report, forward the report to the LMF 672 and/or directly to the other TRPs 602, or wait to see if other UEs in the vicinity report the same event. If the TRP 602 determines that the report is credible (e.g., based on knowing that the particular UE is credible, or upon receiving reports from a sufficient number of UEs), the TRP 602 can adjust, where possible, the source of the bias based on the UE's 604 report. If the UE 604 cannot identify the specific source of the bias event, the TRP 602 can attempt to identify the source of the bias. For example, if the bias event could be an incorrect base station location or an incorrect clock synchronization, the TRP 602 can check its location information provided to the UE 604 in the assistance data to confirm it is correct, and check its synchronization to the other TRPs 602. Upon identifying the source of the bias, the TRP 602 can correct it or, if necessary (e.g., due to incorrect location information in the assistance data), request that the LMF 672 correct it.

Upon reception of the bias event report from the UE 604 or the serving TRP 602, the LMF 672 can also ignore the report, forward the report to the other TRPs 602, or wait to see if other UEs in the vicinity report the same event. If the LMF 672 determines that the report is credible, the LMF 672 can instruct the offending TRP 602 to adjust, where possible, the source of the bias based on the UE's 604 report. If the report does not identify the specific source of the bias event, the LMF 672 can attempt to identify the source of the bias. For example, if the bias event could be an incorrect base station location or an incorrect synchronization, the LMF 672 can check the location of the offending TRP 602 provided to the UE 604 in the assistance data to confirm it is correct, and instruct the TRP 602 to check its synchronization with the other TRPs 602. Upon identifying the source of the bias, the LMF 672 can correct it or, if necessary (e.g., due to incorrect synchronization), instruct the offending TRP 602 to correct it.

Note that the UE 604 may report the bias event to the offending TRP 602 (or the serving TRP 602 if it cannot send the report to the offending TRP 602) rather than the LMF 672 for latency reasons. Specifically, sending the report to a TRP 602 allows the UE 604 to report the event faster, and the offending TRP 602 to address the report faster. If desired, the UE 604 or the receiving TRP 602 can subsequently send the report to the LMF 672 to enable the LMF 672 to track such reports across multiple UEs 604 and TRPs 602, and/or to make corrections that the offending and/or serving TRP 602 cannot.

If the bias event is corrected, the offending TRP 602, the serving TRP 602, and/or the LMF 672 may inform the UE 604 that it has been corrected. Alternatively, the UE 604 may detect that the bias event has been corrected based on its own measurements of the nuisance parameters. For example, the Kalman filter may indicate that new values of the nuisance parameters match the expected values of the nuisance parameters and can therefore be used to accurately calculate the location of the UE 604. In that case, the UE 604 can then calculate its location using the corrected parameters.

Alternatively, if the bias event is not corrected, or until it is, the UE 604 can still calculate an estimate of its location, but also determine an uncertainty value or confidence level in the location estimate due to the bias event. The UE 604 can report this uncertainty value/confidence level when reporting its location (e.g., to a third-party application running on the UE 604, the network, etc.).

Note that although the foregoing has generally described the positioning session as a TDOA session, the above techniques are also applicable to other positioning procedures, such as RTT positioning procedures, AoA positioning procedures, UL-TDOA positioning procedures, etc. In general, the above techniques are more beneficial for UE-based positioning procedures, but may also be beneficial for UE-assisted positioning procedures in which a different positioning entity (e.g., LMF 672) calculates the UE's 604 location.

In an aspect, a UE may not perform the calculations to detect a bias event, but may instead report the measurements needed to detect a bias event to a bias detection entity (e.g., its serving base station or a server (e.g., location server, a security server, etc.)). The bias detection entity may then determine whether or not there is a bias event associated with one or more of the TRPs the UE is measuring. More specifically, as described above, a Kalman filter can be used to model the expected values of various parameters ("nuisance parameters") related to base station synchronization, TRP ID, PRS ID, and/or frequency layer ID timing, base station location, a phase and/or power difference in different PRS, polarization, and the like. In the present case, instead of implementing the Kalman filter itself, the UE reports the measurements associated with these parameters (i.e., the inputs to the Kalman filter), and the bias detection entity runs the Kalman filter to model the expected values of the nuisance parameters based on the measurements received from the UE.

For example, to track base station synchronization, the UE may monitor the ToA of reference signals received from multiple base stations and, instead of inputting them into a locally-implemented Kalman filter, may report the values to the bias detection entity. The bias detection entity inputs the measurements into its Kalman filter, and if the ToA of reference signals from a particular base station start to drift from the expected values (as predicted by the Kalman filter), it may indicate that the base station is out of synchronization. The bias detection entity can then take corrective action as described above.

Figure 7:
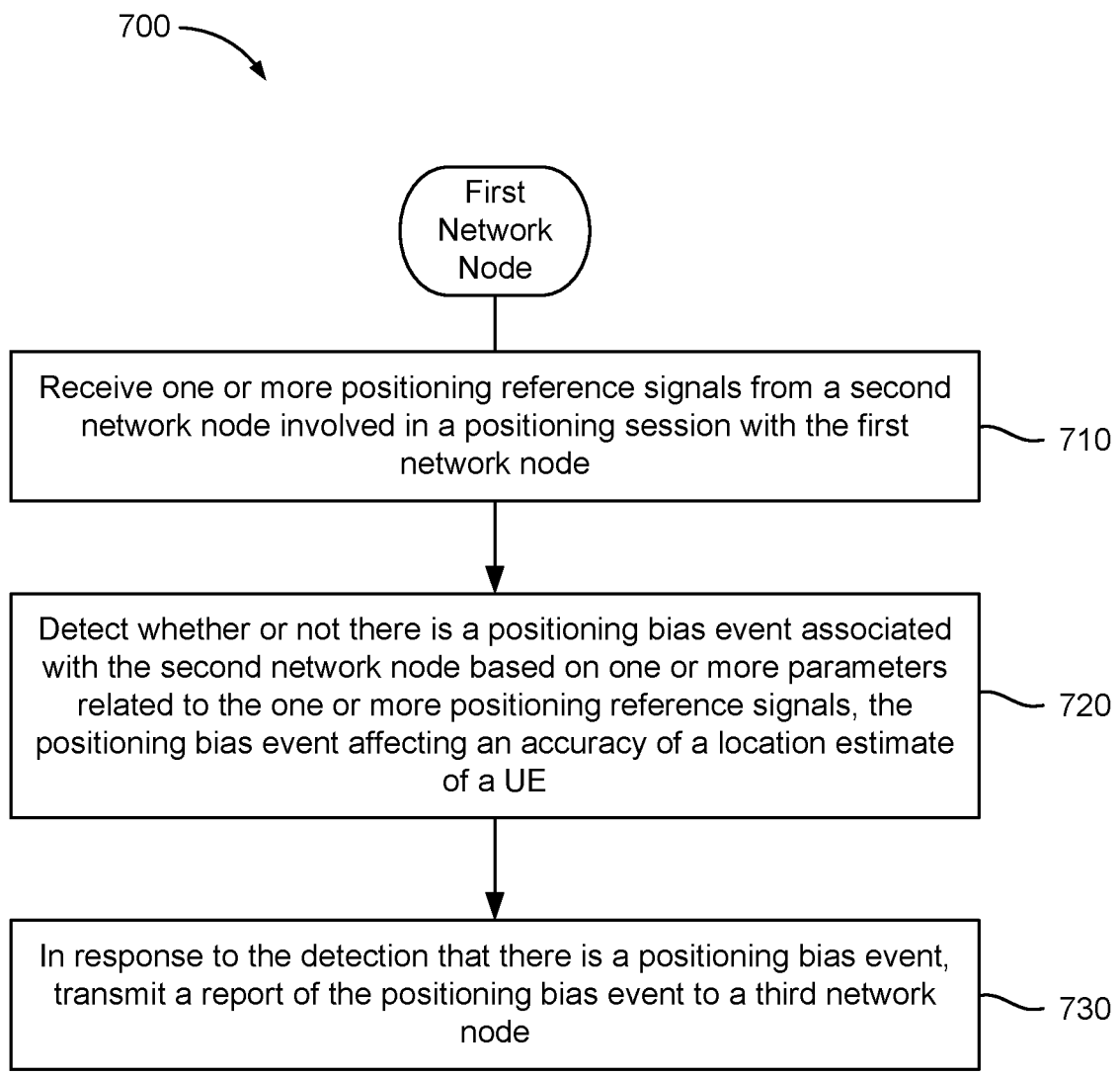
FIGS. 7 and 8 illustrate example methods of wireless communication, according to aspects of the disclosure.

FIG. 7 illustrates an example method 700 of wireless communication, according to aspects of the disclosure. In an aspect, the method 700 may be performed by a first network node (e.g., any of the UEs described herein, a mobile base station, a relay, etc.).

At 710, the first network node receives one or more positioning reference signals (e.g., PRS, TRS, etc.) from a second network node (e.g., a TRP of any of the base stations described herein, another UE) involved in a positioning session (e.g., DL-TDOA, OTDOA, UL-TDOA, RTT, AoA, etc.) with the first network node. In an aspect, operation 710 may be performed by WWAN transceiver 310, processing system 332, memory component 340, positioning component 342, any or all of which may be considered means for performing this operation.

At 720, the first network node detects whether or not there is a positioning bias event associated with the second network node based on one or more parameters (nuisance parameters) related to the one or more positioning reference signals, the positioning bias event affecting an accuracy of a location estimate of a UE (e.g., the first network node or any of the UEs described herein). In an aspect, operation 720 may be performed by WWAN transceiver 310, processing system 332, memory component 340, positioning component 342, any or all of which may be considered means for performing this operation.

At 730, the first network node transmits, in response to the detection that there is a positioning bias event, a report of the positioning bias event to a third network node (e.g., the TRP, a serving TRP if not the TRP, a location server, and/or another UE). In an aspect, operation 730 may be performed by WWAN transceiver 310, processing system 332, memory component 340, positioning component 342, any or all of which may be considered means for performing this operation.

Figure 8:
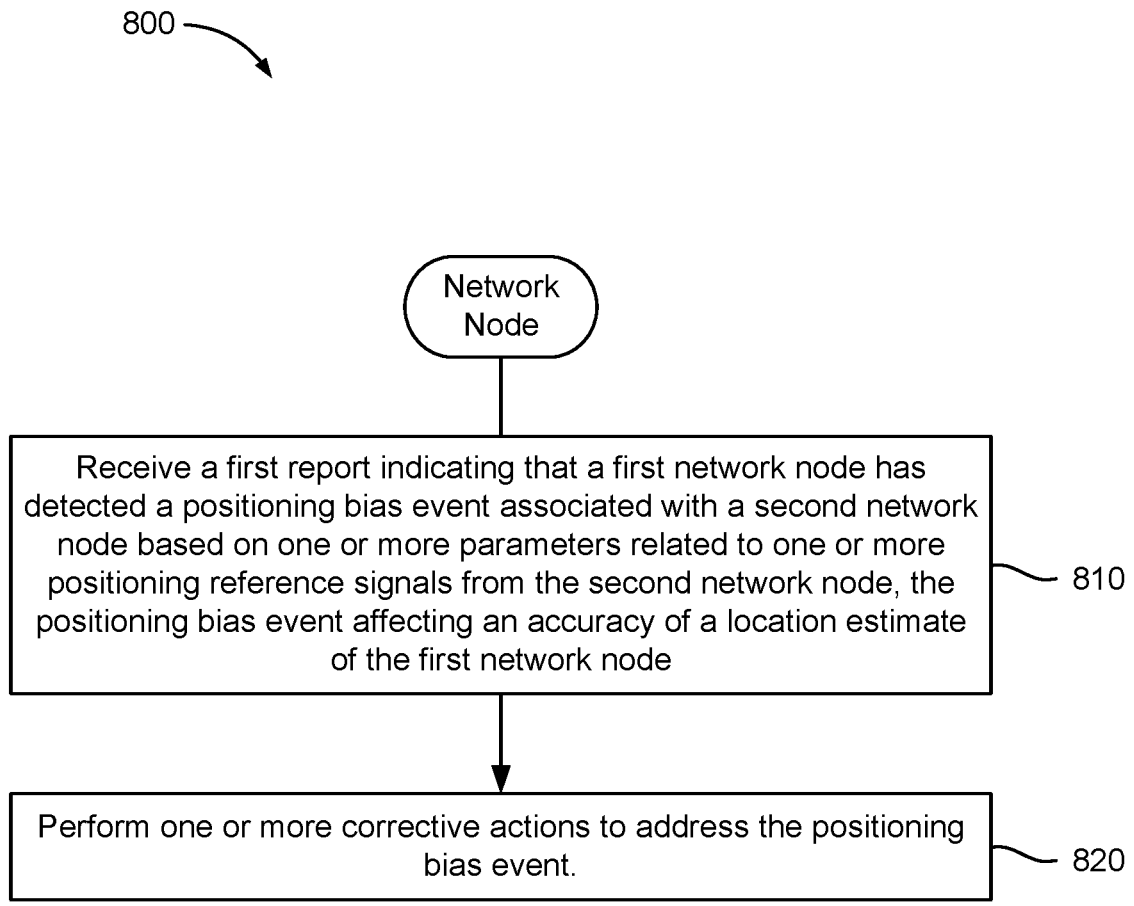

FIG. 8 illustrates an example method 800 of wireless communication, according to aspects of the disclosure. In an aspect, the method 800 may be performed by a network node (e.g., an offending TRP, a serving TRP if not the offending TRP, a location server, or another UE)

At 810, the network node receives a first report indicating that a first network node (e.g., any of the UEs described herein, a mobile base station, a relay, etc.) has detected a positioning bias event associated with a second network node (e.g., a TRP of any of the base stations described herein) based on one or more parameters related to one or more positioning reference signals from the second network node, the positioning bias event affecting an accuracy of a location estimate of the first network node. In an aspect, operation 810 may be performed by WWAN transceiver 350, processing system 384, memory component 386, positioning component 388, any or all of which may be considered means for performing this operation.

At 820, the network node performs one or more corrective actions to address the positioning bias event, as described above. In an aspect, operation 820 may be performed by WWAN transceiver 350, processing system 384, memory component 386, positioning component 388, any or all of which may be considered means for performing this operation.

As will be appreciated, a technical advantage of the methods 700 and 800 is increased positioning accuracy for a UE being positioned.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE), comprising: receiving one or more positioning reference signals from a first transmission-reception point (TRP) involved in a positioning session with the UE; detecting whether there is a positioning bias event associated with the first TRP based on one or more parameters related to the one or more positioning reference signals, the positioning bias event affecting an accuracy of a location estimate of the UE; and in response to the detection that there is a positioning bias event, transmitting a report of the positioning bias event to a network node.

Clause 2. The method of Clause 1, wherein the one or more parameters include one or more dynamic parameters that change during the positioning session and/or one or more static parameters that are defined at a beginning of the positioning session.

Clause 3. The method of any of Clauses 1 and 2, wherein the one or more parameters include one or more parameters indicating that the first TRP is out of synchronization with other TRPs involved in the positioning session, one or more parameters indicating a timing bias occurring at a TRP identifier (ID), positioning reference signal (PRS) ID, and/or frequency layer ID level due to calibration errors in the first TRP, one or more parameters indicating an inaccurate location of the first TRP, one or more parameters indicating a phase and/or power difference in the one or more positioning reference signals from the first TRP, one or more parameters indicating a failure of a polarization verification to detect non-line of sight (NLOS) paths between the UE and the first TRP, or any combination thereof.

Clause 4. The method of any of Clauses 1-3, wherein the report includes an identification of the positioning bias event and a timestamp indicating when the positioning bias event occurred.

Clause 5. The method of Clause 4, wherein the report further includes values of the one or more parameters detected by the UE.

Clause 6. The method of any of Clauses 1-5, wherein the UE detects the positioning bias event using a Kalman filter that models expected values of the one or more parameters based on previous values of the one or more parameters.

Clause 7. The method of any of Clauses 1-6, wherein the first TRP is a neighboring TRP and the network node is a serving TRP.

Clause 8. The method of any of Clauses 1-6, wherein the first TRP and the network node are the same TRP.

Clause 9. The method of Clause 8, wherein the first TRP is a serving TRP.

Clause 10. The method of Clause 8, wherein the first TRP is a neighboring TRP.

Clause 11. The method of any of Clauses 1-6, wherein the network node is a second UE connected to the UE over a wireless sidelink.

Clause 12. The method of any of Clauses 1-6, wherein the network node is a location server.

Clause 13. The method of any of Clauses 1-12, further comprising: determining that the positioning bias event has been corrected; and calculating the location estimate of the UE based on the positioning bias event having been corrected.

Clause 14. The method of Clause 13, wherein the UE determines that the positioning bias event has been corrected based on new values of the one or more parameters matching expected values of the one or more parameters.

Clause 15. The method of Clause 14, wherein the expected values of the one or more parameters are determined by a Kalman filter executed by the UE.

Clause 16. The method of Clause 13, wherein the UE determines that the positioning bias event has been corrected based on receiving a notification from the network node that the positioning bias event has been corrected.

Clause 17. The method of any of Clauses 1-16, further comprising: calculating the location estimate of the UE; and calculating an uncertainty value for the location estimate based on the one or more parameters.

Clause 18. The method of any of Clauses 1-17, wherein the positioning session comprises an observed time difference of arrival (OTDOA) positioning session, a round-trip-time (RTT) positioning session, or an angle of arrival (AoA) positioning session.

Clause 19. A method of wireless communication performed by a network node, comprising: receiving a first report indicating that a first user equipment (UE) has detected a positioning bias event associated with a transmission-reception point (TRP) based on one or more parameters related to one or more positioning reference signals from the TRP, the positioning bias event affecting an accuracy of a location estimate of the first UE; and performing one or more corrective actions to address the positioning bias event.

Clause 20. The method of Clause 19, wherein the one or more parameters include one or more parameters indicating that the TRP is out of synchronization with other TRPs, one or more parameters indicating a timing bias occurring at a TRP identifier (ID), positioning reference signal (PRS) ID, and/or frequency layer ID level due to calibration errors in the TRP, one or more parameters indicating an inaccurate location of the TRP, one or more parameters indicating a phase and/or power difference in the one or more positioning reference signals from the TRP, one or more parameters indicating a failure of a polarization verification to detect non-line of sight (NLOS) paths between the first UE and the TRP, or any combination thereof.

Clause 21. The method of any of Clauses 19 and 20, wherein the first report includes an identification of the positioning bias event and a timestamp indicating when the positioning bias event occurred.

Clause 22. The method of Clause 21, wherein the first report further includes values of the one or more parameters detected by the first UE.

Clause 23. The method of any of Clauses 19-22, further comprising: receiving a plurality of reports, including the first report, indicating that a plurality of UEs, including the first UE, has detected the positioning bias event associated with the TRP.

Clause 24. The method of Clause 23, wherein the network node performs the one or more corrective actions based on a number of the plurality of reports being greater than a threshold.

Clause 25. The method of any of Clauses 19-24, wherein the one or more corrective actions comprise: instructing the UE to calculate a first estimate of a location of the UE based on the one or more parameters and a second estimate of the location of the UE based on corrected values of the one or more parameters to determine which estimate provides better accuracy, or correcting the positioning bias event.

Clause 26. The method of Clause 25, wherein the network node is a location server, and wherein correcting the positioning bias event comprises instructing the TRP to correct the positioning bias event.

Clause 27. The method of any of Clauses 25 and 26, further comprising: receiving, from the UE, an indication that the second estimate of the location of the UE is more accurate than the first estimate of the location of the UE; and correcting the positioning bias event based on the indication.

Clause 28. The method of any of Clauses 19-27, wherein the network node is a serving TRP for the first UE.

Clause 29. The method of any of Clauses 19-27, wherein the network node is the TRP.

Clause 30. The method of Clause 29, wherein the TRP is a neighboring TRP of the UE.

Clause 31. The method of Clause 29, wherein the TRP is a serving TRP of the UE.

Clause 32. The method of any of Clauses 19-27, 30, and 31, wherein the network node is a location server.

Clause 33. The method of any of Clauses 19-32, further comprising: transmitting a message to the UE indicating that the positioning bias event has been corrected.

Clause 34. An apparatus comprising a memory and at least one processor communicatively coupled to the memory, the memory and the at least one processor configured to perform a method according to any of clauses 1-33.

Clause 35. An apparatus comprising means for performing a method according to any of clauses 1-33.

Clause 36. A non-transitory computer-readable medium storing computer-executable instructions, the computer-executable comprising at least one instruction for causing a computer or processor to perform a method according to any of clauses 1-33.

Additional implementation examples are described in the following numbered clauses:

Clause 1. A method of wireless communication performed by a first network node, comprising: receiving one or more positioning reference signals from a second network node involved in a positioning session with the first network node; detecting whether there is a positioning bias event associated with the second network node based on one or more parameters related to the one or more positioning reference signals, the positioning bias event affecting an accuracy of a location estimate of a user equipment (UE); and in response to the detection that there is a positioning bias event, transmitting a report of the positioning bias event to a third network node.

Clause 2. The method of Clause 1, wherein the one or more parameters include one or more dynamic parameters that change during the positioning session and/or one or more static parameters that are defined at a beginning of the positioning session.

Clause 3. The method of any of Clauses 1-2, wherein the one or more parameters include one or more parameters indicating that the second network node is out of synchronization with other TRPs involved in the positioning session, one or more parameters indicating a timing bias occurring at a TRP identifier (ID), positioning reference signal (PRS) ID, and/or frequency layer ID level due to calibration errors in the second network node, one or more parameters indicating an inaccurate location of the second network node, one or more parameters indicating a phase and/or power difference in the one or more positioning reference signals from the second network node, one or more parameters indicating a failure of a polarization verification to detect non-line of sight (NLOS) paths between the UE and the second network node, or any combination thereof.

Clause 4. The method of any of Clauses 1-3, wherein the report includes an identification of the positioning bias event and a timestamp indicating when the positioning bias event occurred.

Clause 5. The method of Clause 4, wherein the report further includes values of the one or more parameters detected by the first network node.

Clause 6. The method of any of Clauses 1-5, wherein the first network node detects the positioning bias event using a Kalman filter that models expected values of the one or more parameters based on previous values of the one or more parameters.

Clause 7. The method of any of Clauses 1-6, wherein the second network node is a neighboring TRP and the third network node is a serving TRP.

Clause 8. The method of any of Clauses 1-6, wherein the second network node and the third network node are the same TRP.

Clause 9. The method of Clause 8, wherein: the second network node is a serving TRP, or the second network node is a neighboring TRP.

Clause 10. The method of any of Clauses 1-6, wherein the third network node is a second UE connected to the first network node over a wireless sidelink.

Clause 11. The method of any of Clauses 1-6, wherein the third network node is a location server.

Clause 12. The method of any of Clauses 1-11, further comprising: determining that the positioning bias event has been corrected; and calculating the location estimate of the UE based on the positioning bias event having been corrected.

Clause 13. The method of Clause 12, wherein the first network node determines that the positioning bias event has been corrected based on new values of the one or more parameters collected by the first network node matching expected values of the one or more parameters calculated by the first network node.

Clause 14. The method of Clause 13, wherein the expected values of the one or more parameters are determined by a Kalman filter executed by the first network node.

Clause 15. The method of Clause 12, wherein the first network node determines that the positioning bias event has been corrected based on receiving a notification from the third network node that the positioning bias event has been corrected.

Clause 16. The method of any of Clauses 1-15, further comprising: calculating the location estimate of the UE; and calculating an uncertainty value for the location estimate based on the one or more parameters.

Clause 17. A method of wireless communication performed by a network node, comprising: receiving a first report indicating that a first network node has detected a positioning bias event associated with a second network node based on one or more parameters related to one or more positioning reference signals from the second network node, the positioning bias event affecting an accuracy of a location estimate of the first network node; and performing one or more corrective actions to address the positioning bias event.

Clause 18. The method of Clause 17, wherein the one or more parameters include one or more parameters indicating that the second network node is out of synchronization with other TRPs, one or more parameters indicating a timing bias occurring at a TRP identifier (ID), positioning reference signal (PRS) ID, and/or frequency layer ID level due to calibration errors in the second network node, one or more parameters indicating an inaccurate location of the second network node, one or more parameters indicating a phase and/or power difference in the one or more positioning reference signals from the second network node, one or more parameters indicating a failure of a polarization verification to detect non-line of sight (NLOS) paths between the first network node and the second network node, or any combination thereof.

Clause 19. The method of any of Clauses 17-18, wherein the first report includes: an identification of the positioning bias event, a timestamp indicating when the positioning bias event occurred, values of the one or more parameters detected by the first network node, or any combination thereof.

Clause 20. The method of any of Clauses 17-19, further comprising: receiving a plurality of reports, including the first report, indicating that a plurality of network nodes, including the first network node, has detected the positioning bias event associated with the second network node.

Clause 21. The method of Clause 20, wherein the network node performs the one or more corrective actions based on a number of the plurality of reports being greater than a threshold.

Clause 22. The method of any of Clauses 17-21, wherein the one or more corrective actions comprise: instructing the first network node to calculate a first estimate of a location of the first network node based on the one or more parameters and a second estimate of the location of the first network node based on corrected values of the one or more parameters to determine which estimate provides better accuracy, or correcting the positioning bias event.

Clause 23. The method of Clause 22, wherein: the network node is a location server, and correcting the positioning bias event comprises instructing the second network node to correct the positioning bias event.

Clause 24. The method of Clause 22, further comprising: receiving, from the first network node, an indication that the second estimate of the location of the first network node is more accurate than the first estimate of the location of the first network node; and correcting the positioning bias event based on the indication.

Clause 25. The method of Clause 17-21, wherein: the first network node is a UE, and the network node is a serving TRP for the first network node.

Clause 26. The method of Clause 17-21, wherein the network node is the second network node.

Clause 27. The method of Clause 26, wherein: the second network node is a neighboring TRP of the first network node, or the second network node is a serving TRP of the first network node.

Clause 28. The method of any of Clauses 17-27, further comprising: transmitting a message to the first network node indicating that the positioning bias event has been corrected.

Clause 29. An apparatus comprising a memory and at least one processor communicatively coupled to the memory, the memory and the at least one processor configured to perform a method according to any of clauses 1-28.

Clause 30. An apparatus comprising means for performing a method according to any of clauses 1-28.

Clause 31. A non-transitory computer-readable medium storing computer-executable instructions, the computer-executable comprising at least one instruction for causing a computer or processor to perform a method according to any of clauses 1-28.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a first network node, comprising:
receiving one or more positioning reference signals from a second network node involved in a positioning session with the first network node;
detecting whether there is a positioning bias event associated with the second network node based on one or more parameters related to the one or more positioning reference signals, the positioning bias event affecting an accuracy of a location estimate of a user equipment (UE), wherein the one or more parameters include one or more parameters indicating that the second network node is out of synchronization with other transmission-reception points (TRPs) involved in the positioning session, one or more parameters indicating a timing bias associated with a TRP identifier (ID), positioning reference signal (PRS) ID, frequency layer ID level, or any combination thereof, due to calibration errors in the second network node, one or more parameters indicating an inaccurate location of the second network node, one or more parameters indicating a phase difference, power difference, or both in the one or more positioning reference signals from the second network node, one or more parameters indicating a failure of a polarization verification to detect non-line of sight (NLOS) paths between the UE and the second network node, or any combination thereof; and in response to the detection that there is a positioning bias event, transmitting a report of the positioning bias event to a third network node.

2. The method of claim 1, wherein the one or more parameters include one or more dynamic parameters that change during the positioning session, one or more static parameters that are defined at a beginning of the positioning session, or both.

3. The method of claim 1, wherein the report includes an identification of the positioning bias event and a timestamp indicating when the positioning bias event occurred.

4. The method of claim 3, wherein the report further includes values of the one or more parameters detected by the first network node.

5. The method of claim 1, wherein the first network node detects the positioning bias event using a Kalman filter that models expected values of the one or more parameters based on previous values of the one or more parameters.

6. The method of claim 1, wherein the second network node is a neighboring TRP and the third network node is a serving TRP.

7. The method of claim 1, wherein the second network node and the third network node are the same TRP.

8. The method of claim 7, wherein:
the second network node is a serving TRP, or
the second network node is a neighboring TRP.

9. The method of claim 1, wherein the third network node is a second UE connected to the first network node over a wireless sidelink.

10. The method of claim 1, wherein the third network node is a location server.

11. The method of claim 1, further comprising:
determining that the positioning bias event has been corrected; and
calculating the location estimate of the UE based on the positioning bias event having been corrected.

12. The method of claim 11, wherein the first network node determines that the positioning bias event has been corrected based on new values of the one or more parameters collected by the first network node matching expected values of the one or more parameters calculated by the first network node.

13. The method of claim 12, wherein the expected values of the one or more parameters are determined by a Kalman filter executed by the first network node.

14. The method of claim 11, wherein the first network node determines that the positioning bias event has been corrected based on receiving a notification from the third network node that the positioning bias event has been corrected.

15. The method of claim 1, further comprising:
calculating the location estimate of the UE; and
calculating an uncertainty value for the location estimate based on the one or more parameters.

16. A method of wireless communication performed by a network node, comprising:
receiving a first report indicating that a first network node has detected a positioning bias event associated with a second network node based on one or more parameters related to one or more positioning reference signals from the second network node, the positioning bias event affecting an accuracy of a location estimate of the first network node, wherein the one or more parameters include one or more parameters indicating that the second network node is out of synchronization with other transmission-reception points (TRPs), one or more parameters indicating a timing bias associated with a TRP identifier (ID), positioning reference signal (PRS) ID, frequency layer ID level, or any combination thereof, due to calibration errors in the second network node, one or more parameters indicating an inaccurate location of the second network node, one or more parameters indicating a phase difference, power difference, or both in the one or more positioning reference signals from the second network node, one or more parameters indicating a failure of a polarization verification to detect non-line of sight (NLOS) paths between the first network node and the second network node, or any combination thereof; and
performing one or more corrective actions to address the positioning bias event.

17. The method of claim 16, wherein the first report includes:
an identification of the positioning bias event,
a timestamp indicating when the positioning bias event occurred,
values of the one or more parameters detected by the first network node, or
any combination thereof.

18. The method of claim 16, further comprising:
receiving a plurality of reports, including the first report, indicating that a plurality of network nodes, including the first network node, has detected the positioning bias event associated with the second network node.

19. The method of claim 18, wherein the network node performs the one or more corrective actions based on a number of the plurality of reports being greater than a threshold.

20. The method of claim 16, wherein the one or more corrective actions comprise:
instructing the first network node to calculate a first estimate of a location of the first network node based on the one or more parameters and a second estimate of the location of the first network node based on corrected values of the one or more parameters to determine which estimate provides better accuracy, or
correcting the positioning bias event.

21. The method of claim 20, wherein:
the network node is a location server, and
correcting the positioning bias event comprises instructing the second network node to correct the positioning bias event.

22. The method of claim 20, further comprising:
receiving, from the first network node, an indication that the second estimate of the location of the first network node is more accurate than the first estimate of the location of the first network node; and
correcting the positioning bias event based on the indication.

23. The method of claim 16, wherein:
the first network node is a UE, and
the network node is a serving TRP for the first network node.

24. The method of claim 16, wherein the network node is the second network node.

25. The method of claim 24, wherein:
the second network node is a neighboring TRP of the first network node, or the second network node is a serving TRP of the first network node.

26. The method of claim 16, further comprising:
transmitting a message to the first network node indicating that the positioning bias event has been corrected.

27. A first network node, comprising:
one or more memories;
one or more transceivers; and
one or more processors communicatively coupled to the one or more memories and the one or more transceivers, the one or more processors, either alone or in combination, configured to:
 receive, via the one or more transceivers, one or more positioning reference signals from a second network node involved in a positioning session with the first network node;
 detect whether or not there is a positioning bias event associated with the second network node based on one or more parameters related to the one or more positioning reference signals, the positioning bias event affecting an accuracy of a location estimate of a user equipment (UE), wherein the one or more parameters include one or more parameters indicating that the second network node is out of synchronization with other transmission-reception points (TRPs) involved in the positioning session, one or more parameters indicating a timing bias associated with a TRP identifier (ID), positioning reference signal (PRS) ID, frequency layer ID level, or any combination thereof, due to calibration errors in the second network node, one or more parameters indicating an inaccurate location of the second network node, one or more parameters indicating a phase difference, power difference, or both in the one or more positioning reference signals from the second network node, one or more parameters indicating a failure of a polarization verification to detect non-line of sight (NLOS) paths between the UE and the second network node, or any combination thereof; and
 transmit, via the one or more transceivers, in response to the detection that there is a positioning bias event, a report of the positioning bias event to a third network node.

28. A network node, comprising:
one or more memories;
one or more transceivers; and
one or more processors communicatively coupled to the one or more memories and the one or more transceivers, the one or more processors, either alone or in combination, configured to:
 receive, via the at least one or more transceivers, a first report indicating that a first network node has detected a positioning bias event associated with a second network node based on one or more parameters related to one or more positioning reference signals from the second network node, the positioning bias event affecting an accuracy of a location estimate of the first network node, wherein the one or more parameters include one or more parameters indicating that the second network node is out of synchronization with other transmission-reception points (TRPs), one or more parameters indicating a timing bias associated with a TRP identifier (ID), positioning reference signal (PRS) ID, frequency layer ID level, or any combination thereof, due to calibration errors in the second network node, one or more parameters indicating an inaccurate location of the second network node, one or more parameters indicating a phase difference, power difference, or both in the one or more positioning reference signals from the second network node, one or more parameters indicating a failure of a polarization verification to detect non-line of sight (NLOS) paths between the first network node and the second network node, or any combination thereof; and
 perform one or more corrective actions to address the positioning bias event.

* * * * *